(12) United States Patent
Woo

(10) Patent No.: US 10,979,450 B2
(45) Date of Patent: Apr. 13, 2021

(54) METHOD AND SYSTEM FOR BLOCKING PHISHING OR RANSOMWARE ATTACK

(71) Applicant: NAMUSOFT CO., LTD., Seoul (KR)

(72) Inventor: Jong Hyun Woo, Seoul (KR)

(73) Assignee: NAMUSOFT CO., LTD., Seoul (KR)

( * ) Notice: Subject to any disclaimer, the term of this patent is extended or adjusted under 35 U.S.C. 154(b) by 60 days.

(21) Appl. No.: 15/554,530

(22) PCT Filed: Jul. 20, 2017

(86) PCT No.: PCT/KR2017/007814
§ 371 (c)(1),
(2) Date: Aug. 30, 2017

(87) PCT Pub. No.: WO2018/030667
PCT Pub. Date: Feb. 15, 2018

(65) Prior Publication Data
US 2019/0028488 A1    Jan. 24, 2019

(30) Foreign Application Priority Data

Aug. 8, 2016 (KR) ........................ 10-2016-0100945

(51) Int. Cl.
*H04L 29/00* (2006.01)
*H04L 29/06* (2006.01)
(Continued)

(52) U.S. Cl.
CPC .......... *H04L 63/145* (2013.01); *G06F 16/182* (2019.01); *G06F 21/554* (2013.01); *G06F 21/6218* (2013.01); *H04L 63/0245* (2013.01); *H04L 63/1483* (2013.01); *H04L 63/083* (2013.01); *H04L 63/0823* (2013.01); *H04L 63/10* (2013.01)

(58) Field of Classification Search
CPC .. G06F 16/182; G06F 21/6218; G06F 21/554; H04L 63/0245; H04L 63/1483; H04L 63/145; H04L 63/0823; H04L 63/083; H04L 63/10
See application file for complete search history.

(56) References Cited

U.S. PATENT DOCUMENTS 7,693,962 B2 *  4/2010  Serlet ................. H04L 29/06
                                              709/219
9,860,610 B2 *  1/2018  Bury ..................... G06F 17/211
(Continued)

*Primary Examiner* — Don G Zhao
(74) *Attorney, Agent, or Firm* — Rabin & Berdo, P.C.

(57) ABSTRACT

Provided is a system for blocking an external attack, which includes: a network file server; and a network file server (NFS) client installed in a user terminal or a service server and communication-connected with the network file server which is remotely positioned, and the network file server determines, when there is an access or opening request of a file stored in the network file server mounted in the user terminal or service server in a network drive format from the NFS client, whether at least one of the user information and the program information to request the access or opening is authorized and blocks the access to the file which is requested to be accessed or provides the file of which opening is requested to the NFS client only in a read only mode when the access or opening request is unauthorized according to a determination result.

4 Claims, 6 Drawing Sheets

(51) Int. Cl.
*G06F 21/55* (2013.01)
*G06F 16/182* (2019.01)
*G06F 21/62* (2013.01)

(56) References Cited

U.S. PATENT DOCUMENTS

| | | | | |
|---|---|---|---|---|
| 10,430,588 B2* | 10/2019 | Volkov | ................ | H04L 63/1491 |
| 2007/0005984 A1* | 1/2007 | Florencio | ................ | H04L 63/14 |
| | | | | 713/178 |
| 2008/0168496 A1* | 7/2008 | Lee | .................... | H04N 5/44591 |
| | | | | 725/39 |
| 2008/0227552 A1* | 9/2008 | Shimomura | ............ | A63F 13/12 |
| | | | | 463/42 |
| 2010/0058064 A1* | 3/2010 | Kirovski | ................ | H04L 9/3073 |
| | | | | 713/176 |
| 2011/0119750 A1* | 5/2011 | Lu | ............................ | H04L 63/00 |
| | | | | 726/12 |
| 2012/0136924 A1* | 5/2012 | Tomida | ................ | H04W 4/025 |
| | | | | 709/203 |
| 2012/0198553 A1* | 8/2012 | Suginaka | ................ | G06F 21/55 |
| | | | | 726/24 |
| 2012/0255017 A1* | 10/2012 | Sallam | ................ | G06F 9/45558 |
| | | | | 726/24 |
| 2012/0330498 A1* | 12/2012 | Nagara | ................ | G06F 13/382 |
| | | | | 701/33.2 |
| 2013/0067576 A1* | 3/2013 | Niemela | ................ | G06F 21/566 |
| | | | | 726/24 |
| 2013/0276106 A1* | 10/2013 | Barton | .................... | G06F 21/56 |
| | | | | 726/22 |
| 2014/0189808 A1* | 7/2014 | Mahaffey | .............. | H04L 63/083 |
| | | | | 726/4 |
| 2016/0014151 A1* | 1/2016 | Prakash | .............. | H04L 63/1483 |
| | | | | 726/22 |
| 2016/0065550 A1* | 3/2016 | Kanov | .................... | H04L 63/08 |
| | | | | 726/7 |
| 2017/0060597 A1* | 3/2017 | Claes | ...................... | G06F 21/44 |
| 2017/0134423 A1* | 5/2017 | Sysman | ................ | G06F 21/554 |
| 2017/0180760 A1* | 6/2017 | Zhu | .................... | H04N 21/2381 |
| 2017/0346851 A1* | 11/2017 | Drake | ................. | H04L 63/1466 |
| 2018/0060583 A1* | 3/2018 | Vainstein | ............ | G06F 21/6281 |
| 2018/0137309 A1* | 5/2018 | Shapira | .................... | G06F 21/79 |
| 2018/0157834 A1* | 6/2018 | Continella | ............ | G06F 21/554 |
| 2018/0211038 A1* | 7/2018 | Breiman | ................ | G06F 11/14 |
| 2018/0270541 A1* | 9/2018 | Chen | .................. | H04N 21/482 |
| 2019/0205317 A1* | 7/2019 | Tobias | ................. | G06F 3/0487 |

\* cited by examiner

METHOD AND SYSTEM FOR BLOCKING PHISHING OR RANSOMWARE ATTACK

CROSS-REFERENCE TO RELATED APPLICATION(S)

This application claims benefit of priority to Korean Patent Application No. 10-2016-0100945 filed on Aug. 8, 2016 in the Korean Intellectual Property Office, the disclosure of which is incorporated herein by reference in its entirety.

BACKGROUND

1. Field

The present invention relates to a method and a system for blocking a phishing or ransomware attack.

2. Description of Related Art

As phishing and Ransomware distributed by hackers become more and more diverse, users' data are increasingly threatened. Generally, the phishing refers to an attack that seizes account information or electronic certificates, key data, and the like existing in a user terminal due to attacks that leak data stored in the user terminal. Further, the ransomware is an attack technique that requires money after encrypting the data stored in the user terminal or kept in a connected network storage so as to prevent a user from accessing the data. In recent years, there have been various methods and forms of preventing the user from using a PC terminal by manipulating a disk partition of the terminal from preventing the user from using the data after leaking the data.

As the existing method for coping with the phishing attack, a technique that verifies whether a process that encrypts a storage space in a PC and accesses a corresponding specific storage space is a predetermined process is used, but even though the corresponding storage space is encrypted, there is a case where a file constituting the encrypted storage space is taken and decoded.

In addition, as a conventional method to cope with the ransomware attack, there is a method that brings and uses the backed up data even though the PC is infected with the ransomware by periodically backing up the data in the PC to a safe storage area. However, even with this method, there is a problem that the loss of the file that has been recently worked can not be avoided. As another conventional method, there is a method that registers a process of accessing a file server in advance and enables only a process authorized in the PC to access the data, so as to make the data accessible only to the authorized process in the PC to block, when a process which is not registered in advance accesses the data, the process, thereby preventing a ransomware process from accessing the data. However, this method inconveniences registration of the authorized process in advance, and when a program is installed from time to time, there is also a limit in which the process can not be cumbersome to register every time.

In recent years, there is even a case where the ransomware itself does not encrypt only the data stored in the PC, but encrypts the entire PC or encrypts the entire disk mounted on the PC to require ransom money. Therefore, there is a situation that it is no longer sufficient only by preventing encryption of the data.

In addition, since there is an attack that encrypts not only the PC but also the entire data on a Linux or Unix service server at once, there is a situation in which a fundamental alternative is required. Therefore, in order to prevent the phishing, a new technique is required to block the resulting attack by the PC or service server even if the ransomware is run on the PC or service server while preventing the encrypted storage space created on the PC or service server from being stolen.

SUMMARY

The present invention provides a method and a system that effectively block phishing by permitting a file server to access a file when only a predetermined program accesses a file in a corresponding storage space by providing a drive or a client program that enables the network file server to be connected in a PC or a service server and effectively block ransomware by providing a file to a PC or a service server only in a read only mode by a network file server so as to prevent all programs from encrypting or modifying, and deleting data kept in a network file server except for a file write request of a predetermined program even though programs in a general PC or service server may generate a file in a network drive in other cases. In more detail, the present invention provides a method and a system that enable the file or folder kept in the network file server to be mounted and used in the driver or partition by installing a custom file system driver in the PC or service server and prevent the network file server from accessing the file if not accessing a specific file or folder which exists in the network file server through a predetermined program and a method and a system in which a network file server enables the PC to open the file only in a read mode when a file open request is generated in a drive mounted in the PC or service server if an edition mode is not set so as to write data in a specific file or folder through a predetermined network file server user client program.

According to an aspect of the present invention, provided is a system for blocking a phishing or ransomware attack, which includes: a network file server; and a network file server (NFS) client installed in a user terminal or a service server and communication-connected with the network file server which is remotely positioned, and the network file server verifies, when there is an access or opening request of a file stored in the network file server mounted in the user terminal or service server in a network drive format from the NFS client, program information to request the access or opening and determines whether at least one of the user information and the program information to request the access or opening is authorized and blocks the access to the file which is requested to be accessed or provides the file of which opening is requested to the NFS client only in a read only mode when the access or opening request is unauthorized according to a determination result.

According to another aspect of the present invention, provided is a system for blocking a ransomware attack, which includes: a network file server; and a network file server (NFS) client installed in a user terminal or a service server and communication-connected with the network file server which is remotely positioned, and the network file server determines, when there is a change request of a file stored in the network file server mounted in the user terminal or service server in a network drive format from the NFS client, whether at least one of the user information and the program information to request the change is authorized and disapproves the file change request when the change request is unauthorized according to a determination result.

According to yet another aspect of the present invention, provided is a system for blocking a ransomware attack, which includes: a network file server; and a network file server (NFS) client installed in a user terminal or a service server and communication-connected with the network file server which is remotely positioned and the NFS client may provide selection information to enable a user to switch a folder or file stored in the network file server mounted on the user terminal or the service server in a network drive format to an edition mode or end the folder or file. Further, provided is the system for blocking a phishing or ransomware attack, in which the network file server provides, when there is a file opening or change request from the NFS client, in the case where the opening or change request is not a request depending on a state in which switching to the edition mode is selected, the file of which opening is requested to the NFS client only in a read only mode or disapproves the file change request.

According to exemplary embodiments of the present invention, a system for blocking a ransomware attack may operate as follows.

In an exemplary embodiment, a network file server may use a file by read/write with respect to a file access request of a Windows browser. On the contrary, the network file server may provide the file by read only with respect to a file request except for the Windows browser.

In another exemplary embodiment, the network file server may provide the file by read/write with respect to the file access request of a previously designated program and in other cases, the network file server may provide the file only by read only.

In yet another exemplary embodiment, the network file server may provide the file by read only with respect to the file access request of the previously designated program and in other cases, the network file server may deny an access.

According to exemplary embodiments of the present invention, a system for blocking a phishing attack may operate as follows.

In an exemplary embodiment, a program which is permitted to access is selected when a network file system client program is installed in advance and a hash value of a binary file of the selected program is extracted and transferred to a server to prepare for examining which program a program requesting the file the server is afterwards.

Herein, when a file request is made in a network file system, a network file system custom drive may verify the program requesting the file and create the hash value of the corresponding program and transfer the created hash value to the server. Further, a network file server verifies whether the corresponding program is a previously registered program and provides the file when the corresponding program is the previously registered program, but may not provide the file in other cases.

According to exemplary embodiments of the present invention, when a user uses various programs by manipulating a PC terminal, a malicious code is executed by a hacker's trick, so that even though ransomware software operates in a terminal in a PC, user data in a network drive connected with the PC terminal can be protected. Therefore, a back-up work may not be frequently performed to cope with ransomware and it is possible to overcome cumbersome that a separate process is registered in order to set only an authorized process to access the terminal.

BRIEF DESCRIPTION OF DRAWINGS

The above and other aspects, features, and advantages of a system and a method for a phishing or ransomware attack in which.

DETAILED DESCRIPTION

Figure 1:
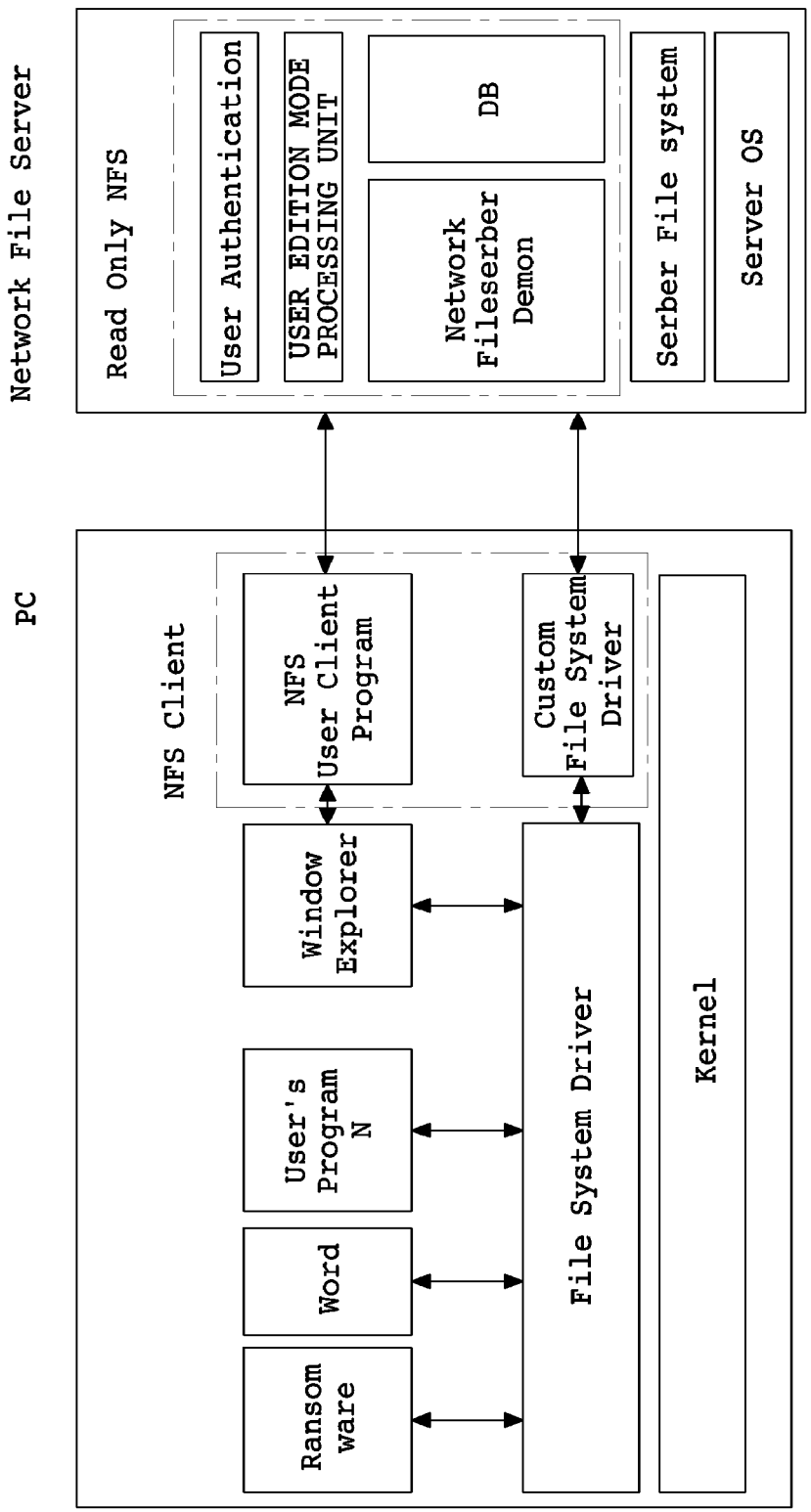
FIG. 1 is a whole system block diagram including a network file server which operates for only reading and a PC in which a client program is installed.

The present invention may have various modifications and various exemplary embodiments and specific exemplary embodiments will be illustrated in the drawings and described in detail in the detailed description. However, this does not limit the present invention within specific exemplary embodiments, and it should be understood that the present invention covers all the modifications, equivalents and replacements within the idea and technical scope of the present invention.

In describing the present invention, a detailed description of related known technologies will be omitted if it is determined that they unnecessarily make the gist of the present invention unclear. In addition, numeral figures (for example, 1, 2, and the like) used during describing the specification are just identification symbols for distinguishing one element from another element.

Further, throughout the specification, if it is described that one component is "connected" or "accesses" the other component, it is understood that the one component may be directly connected to or may directly access the other component but unless explicitly described to the contrary, another component may be "connected" or "access" between the components.

Moreover, throughout the specification, unless explicitly described to the contrary, the word "comprise" and variations such as "comprises" or "comprising", will be understood to imply the inclusion of stated elements but not the exclusion of any other elements. Further, terms including "unit", "module", and the like disclosed in the specification mean a unit that processes at least one function or operation and this may be implemented by one or more hardware or software or a combination of hardware and software.

FIG. 1 is a whole system block diagram including a network file server which operates for only reading and a PC in which a client program is installed. Hereinafter, a method and a system for blocking a ransomware attack according to exemplary embodiments of the present invention will be described based on the system block diagram of FIG. 1 and together with reference to FIGS. 2 to 6. In the present specification, the present invention is described based on a case where a user terminal such as a PC is session-connected to a network file server, but it is apparent that the method and the system may be implemented in the same or similar manner as the following description even when a service server is session-connected to the network file server.

Referring to FIG. 1, a network file server (NFS) client is installed in a personal computer (PC) of a user. The PC of the user is communication-connected with a remote network file server (NFS) through the network file server client.

In the exemplary embodiment of the present invention, when user authentication is normally completed by driving a network file server client program (NFS user client program of FIG. 1) in order to verify whether a corresponding user is a normal user, a storage space of the network file server (NFS) may be mounted onto a drive of the PC through a custom file system driver installed in the PC. That is, in this case, the drive mounted on the PC is a virtual drive.

Thereafter, when the user attempts to open a file kept in the drive mapped to the network file server with a Windows browser or other general application programs, the custom file system driver verifies through which program an attempted file open request is a request to add at least one of user information and a program name to the file open request and transmit the added one to the network file server. In the present specification, for convenience and concentration of description, it is assumed and described that a user ID is used as the user information. However, as information to identify the corresponding user, various user information may be used in addition to the user ID, of course.

However, when the network file server client is driven in the PC according to an implement method, if the network file server authenticates the user ID and a password, a corresponding ID is regarded as a corresponding connection session and a separate ID value may be configured not to be transferred, of course.

A general file server does not examine a program for requesting data after a user account of a terminal that requests the file is authenticated and the general file server is session-connected with the terminal. That is, in the related art, the network file server client driver just requests the file to the file server and does not provide to the server information indicating which file is requested by which program.

However, in order to prevent the ransomware at the center of the file server, it is necessary to provide the file only when the corresponding program is a predetermined program by determining which program a subject currently requesting the file is in addition to which terminal the subject the file is and which user the subject is from the viewpoint of the file server.

Therefore, in the present invention, the custom file system driver requests an identification value of the program which intends to access the file to the network file server together and a network file server Demon is driven to provide data for only reading when the received program identification value is different from a predetermined program identification value.

Depending on a configuration, the network file server Demon previously designates the program to request the file and the user ID and when the user ID is not a previously designated ID, the network file server Demon may provide the user ID to the custom file system driver so as to read the corresponding file open request in the read only mode. Accordingly, when the previously designated program is not a default file explorer of the OS, the file provided from the network file server may operate so as to be accessed for only reading in the PC.

In addition, when the network file server client driver is run by changing the configuration, if the program to request the file is not the previously designated program after downloading a list of programs which may be requested to the server from the server in advance, a client program module may return a message "You do not have an access authority" at a kernel level to program to request the file.

Figure 2:
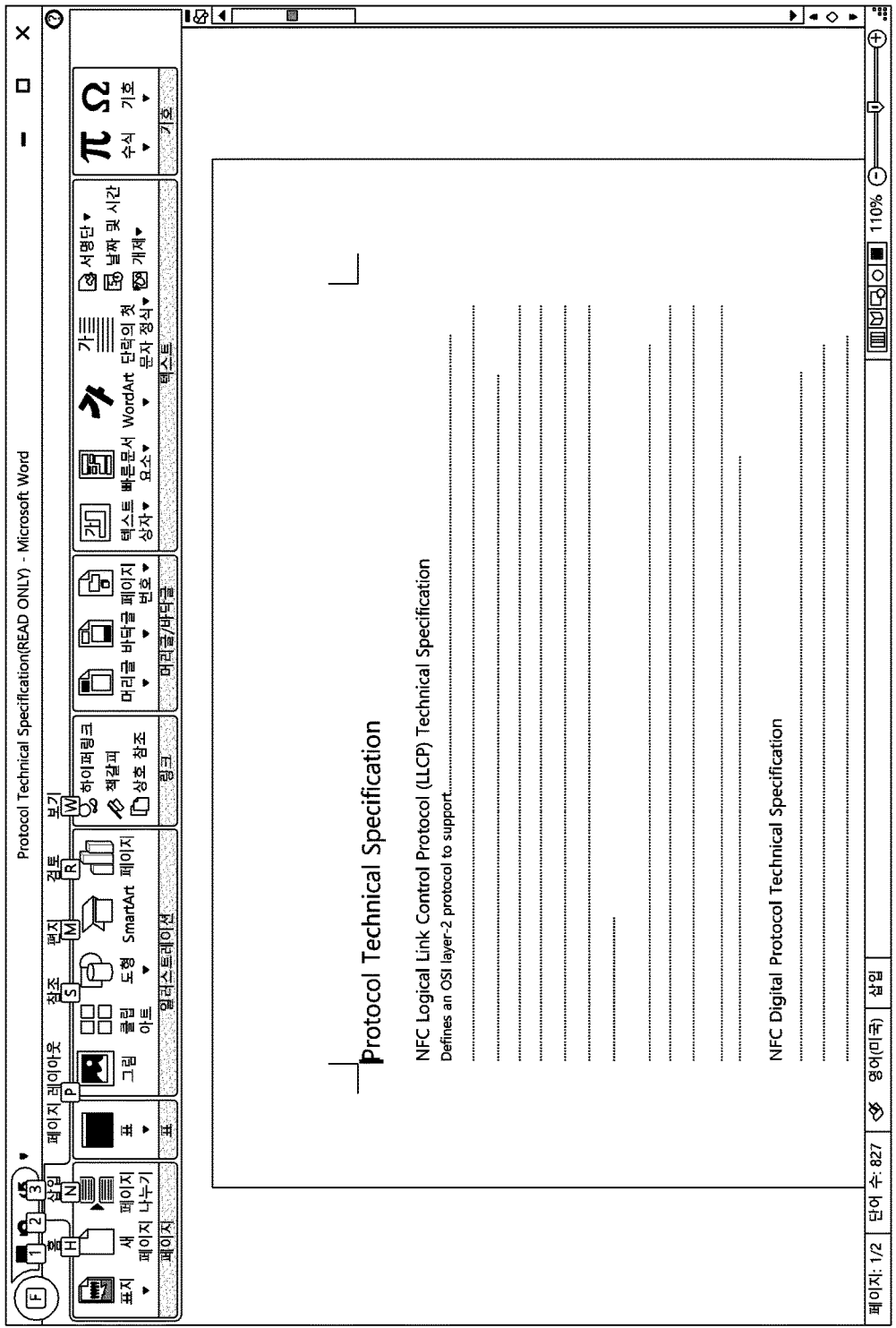
FIG. 2 illustrates an example of a screen in which only reading is displayed in a title bar when a file is opened for only reading according to an exemplary embodiment of the present invention.

FIG. 2 illustrates an example of a screen in which only reading is displayed in a title bar when a file is opened for only reading according to an exemplary embodiment of the present invention.

Further, according to the exemplary embodiment of the present invention, when a specific user program operates to open the file in the drive in a read/write mode, the custom file system driver checks by which program a current request is a request to add at least one of the user ID and the program name and transmit the at least one to the network file server while requesting opening the file in the read/write mode.

In this case, the network file server Demon according to the exemplary embodiment of the present invention may transmit a denial message of the file access request denied in the read/write mode to the custom file system driver. As a result, the custom file system driver may receive the denial message and transmit the received denial message to the program.

Further, as another operation method, when a general program attempts to open the file in the file server in the read/write mode, the custom file system driver may check to see by which program the current request is requested and add the program name while requesting opening the file in the read/write mode and transmit the program name to the network file server. In this case, the network file server Demon provides the corresponding file to the customer file system driver in a read only file open mode when the corresponding program is not the previously designated program with respect to the corresponding file open request. As a result, when the corresponding program is not the previously designated program, the file provided from the network file server is provided only for only reading in the PC.

When an office program itself intends to read the file in the file system, the office program intends to the file in the read/write mode and the programs that operate as such which are usually general programs such as Word or Powerpoint automatically allow the file to be read in the read only mode when the file is provided by a read only file attribute from the file system.

Further, according to the exemplary embodiment of the present invention, when the user initially generates the file in the drive mapped with the network file server by using the windows browser or general application programs, the customer file system driver in the network file server client may transfer a file generation request to the network file server by adding the program and write file information.

In this case, the network file server Demon may generate the corresponding file within a range permitted by the file system in the network file server. Herein, the range permitted by the file system in the server may be, for example, a case where the same file name does not exist in the file system of the server, a capacity to be additionally stored in the file system of the server remains, a file name rule to attempt generation does not exceed a limit of the file system of the server, or the like.

When the file is generated in the network file server, the network file server Demon transfers the corresponding file to be read in the read/write mode by the customer file system driver while updating that the corresponding user ID has a write authority with respect to the corresponding file in a write authority DB (see a DB of FIG. 1).

In this case, the customer file system driver may transfer that a document is opened in the read/write mode of the file to the program and enable the corresponding file to be modified until the program ends.

Thereafter, when the program ends, in the case where closing the file is sensed by the file system driver, the customer file system driver may transfer a file close event to the network file server Demon and the network file server Demon that receives the file close event may remove the corresponding user ID in a write authority DB having write authority information for the corresponding file.

Herein, various file generation and close functions may exist in every operating system file system. For example, even in the case of Windows operating system, when the file is generated, the file may be generated by Openfile( ) and Createfile( ) and even when the file is closed, the file may be closed by Close( ) and Closefile( ). Therefore, the present specification is described based on an overall operating procedure rather than being faithful to every single command.

Further, herein, the network file server client may be a program implemented as a context menu while being extended to the Windows browser and may be run by a separate program. As described above, there is no restriction in an implementation format.

Further, according to the exemplary embodiment of the present invention, when the user requests changing the file to the drive mapped with the network file server by using the Windows browser or general application programs, the customer file system driver may senses a file change command for the file positioned in the network file server and add at least one of the program information and the user ID regarding by which program the file change command information and a current command are generated to the corresponding file information and transmit the at least one to the network file server.

Herein, the file change request means, for example, a request for file encryption, file deletion, file name change, file movement, file time change, file text content change, file binary value change, and the like.

The network file server Demon may verify whether the corresponding user ID is the ID having the write authority in the corresponding work target file in the corresponding user session through the write authority DB. According to a verification result, the network file server Demon may permit a file change command only when there is the file change request from the user ID in which the write authority is granted to the corresponding work target file.

Figure 3:
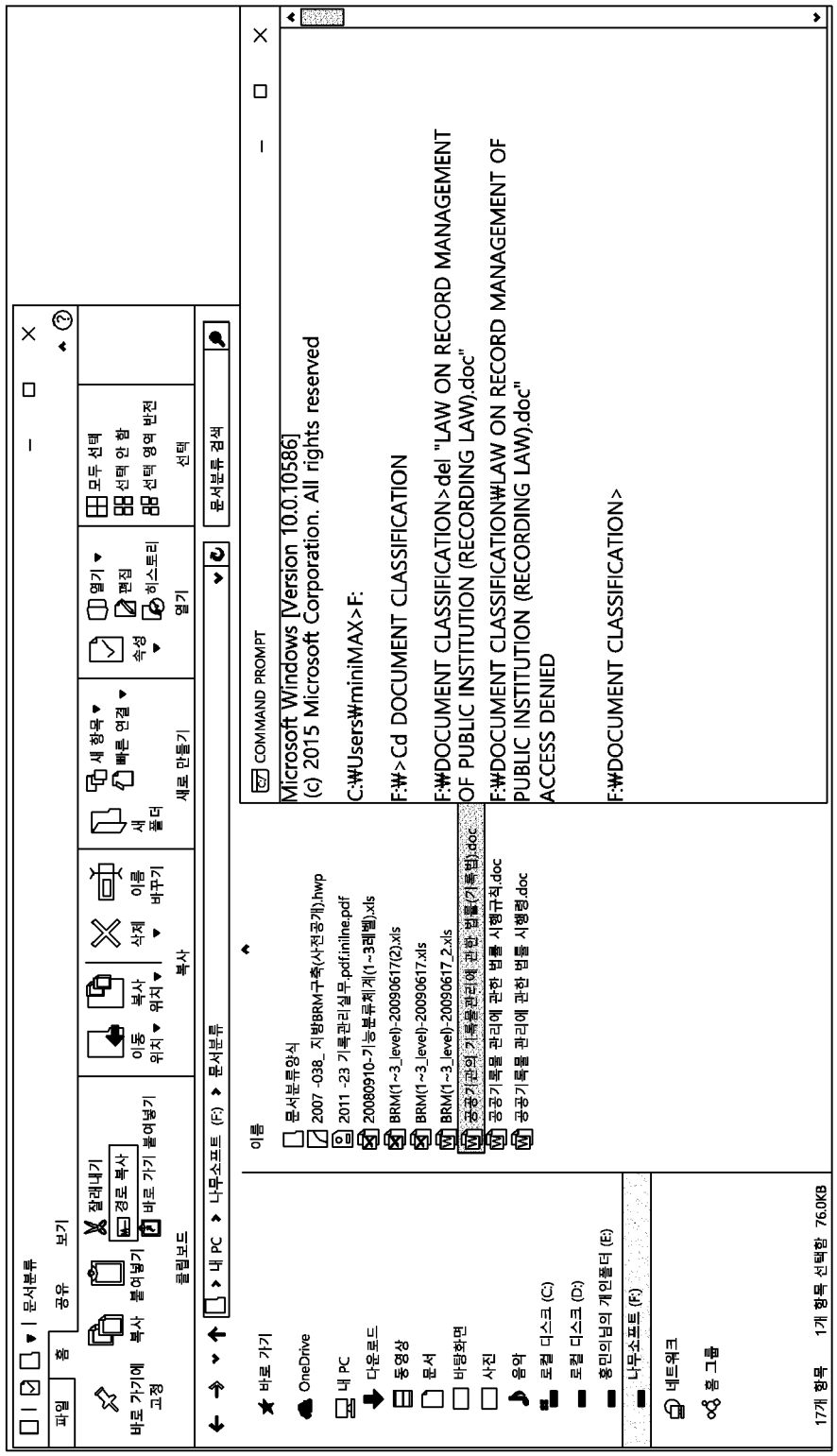
FIG. 3 illustrates an example of a screen of rejecting a case where a name of a file in a network file system drive is intended to be changed to a command in not a windows browser but a DOS command window.

However, in some cases, according to another exemplary embodiment of the present invention, even though the write authority is not granted to the corresponding user ID, when a program that requests the corresponding work request is the Windows browser, a file delete command may be permitted. Herein, the reason is that the Windows browser that may generate the file delete command may be regarded as a user's direct manipulation and normally process the file delete command. As one example thereof, FIG. 3 illustrates an example of a screen of rejecting a case whether a name of a file in a network file system drive is intended to be deleted to a command in not a windows browser but a DOS command window. That is, FIG. 3 illustrates, in a case where the user of an ID to which the write authority is not granted attempts to delete the file through an application program other than the Windows browser, a case that does not permit the attempt.

In a similar manner to the above, in the case of a read command by the previously designated program according to the implementation method, reading of the file is permitted, but the read command by the other program may be disallowed (read-prevented) by the network file server side (more specifically, network file server Demon).

If a certificate is actually stored in a general network file server and mounted on the operating system, all programs running on the operating system may be accessed (read). However, if only a certificate client program is previously set to be accessed, the file may be provided only by the file read request by the certificate client program and the file read request by all other programs may be blocked. Further, if only the certificate generation program restricts the file to be generated by accessing the corresponding network drive, it is apparent that only a previously designated certificate generation program may also write the file.

The network file server Demon may perform the file change command and then transfer a result to the customer file system driver. In this case, a result regarding the work request is finally transferred to the corresponding work request program through the customer file system driver and displayed to the user.

The Windows browser is used as the previously designated program as an example hereinabove, but a type or/and a name of a program which is exceptionally processed as above may vary depending on the operating system. As one example, in MS Windows, the program name for the user to personally manipulate the file is the Windows browser, but in Apple Mac OS, the program name operates as Finder and the program name is just the file browser in X windows of Linux.

Further, a future processing procedure after the network file server completes the processing may vary depending on an operating system operation method. The network file server may announce the processing to the customer file system driver after completing a final operation, but the customer file system driver will be able to verify how the work request is executed to the network file server.

Further, a case where the corresponding program or user ID determines whether to permit the file to be changed according to whether the write authority is granted to the corresponding work file is primarily described as above, but besides, various modifications may be made. For example, a comparison procedure regarding whether the write authority is granted to the corresponding user may be omitted.

Figure 4:
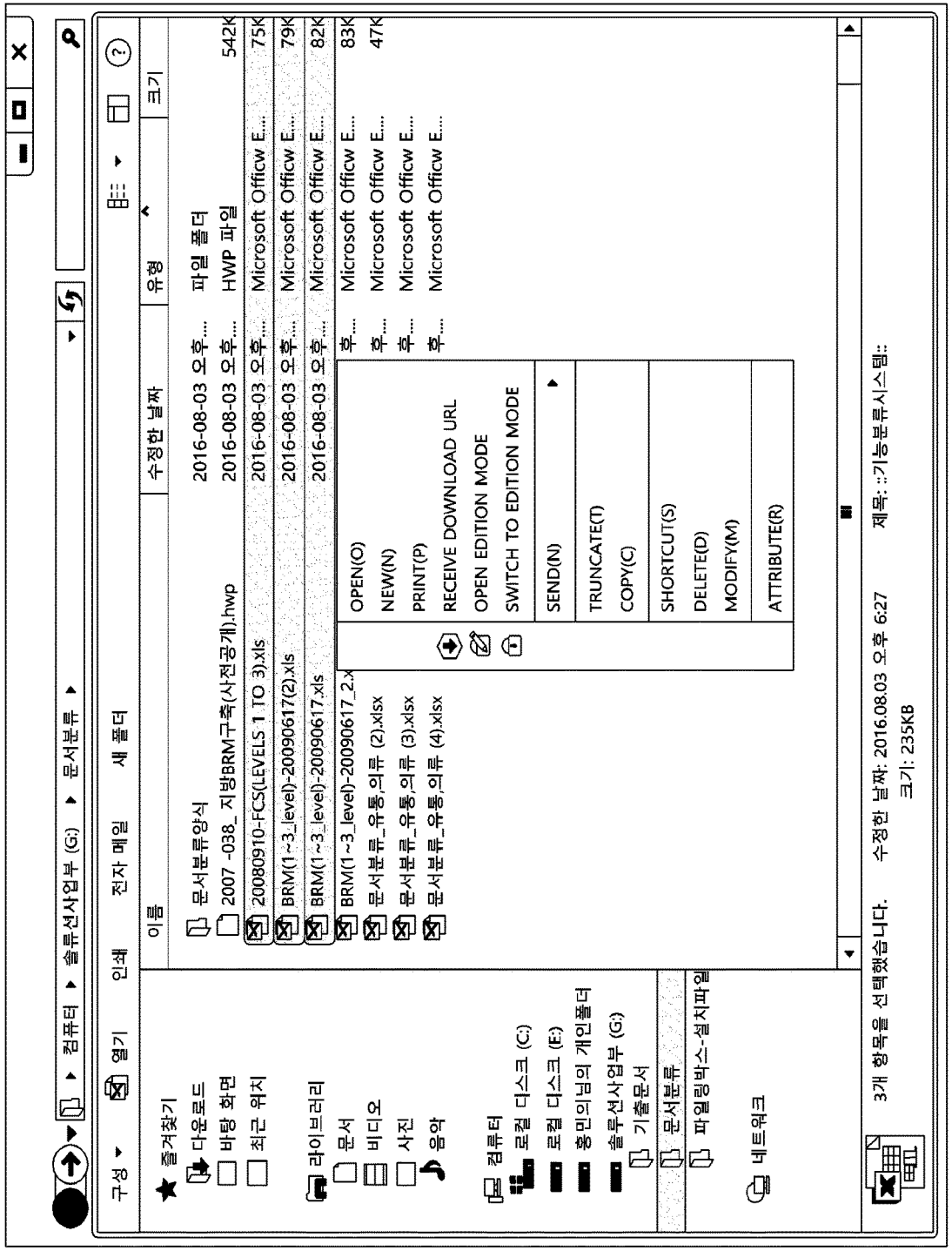
FIG. 4 illustrates an example of a screen for a case where a user intends to 'switch to an edition mode' a file in a storage space in the network file server by using a network file server client program additionally installed in the Windows browser after the storage space of the network file server is mounted onto a drive.

As one example, as illustrated in FIG. 4, even though the corresponding user reads the file by not the previously designated program but the general program through an intentional manipulation, when the corresponding user opens the file by 'switching to edition mode' so as to edit the file, the file server may be implemented to provide the file by a read/write attribute with respect to the corresponding file even though the corresponding program is not the previously designated program. In some cases, when there is a case where it is recognized that it may be clearly distinguished that a user's intentional manipulation action is not the ransomware attack, the file change request may be implemented to be permitted. Herein, FIG. 4 illustrates an example of a screen for a case where a user intends to 'switch to an edition mode' a file in a storage space in the network file server by using a network file server client program additionally installed in the Windows browser after the storage space of the network file server is mounted onto a drive.

A detailed implementation method thereof may be described below. When the network file server client selects switching to edition mode with respect to a file on a specific path by using a normally authorized user ID, an edition mode processing unit (see a user edition mode processing unit of FIG. 1) on the network file server may verify whether the file on the specific path is already written by another user ID. In this case, when another user ID is not registered, the edition mode processing unit grants the right to write the user ID to the file of the writing authority DB to change the setting so that reading/writing is possible only for the corresponding user ID and announce change completion to the network file server client and the network file server provides the file in the read/write mode with respect to the file even though the corresponding user accesses the file by using a program which is not previously designated with respect to a document which is switched to reading/writing.

Figure 6:
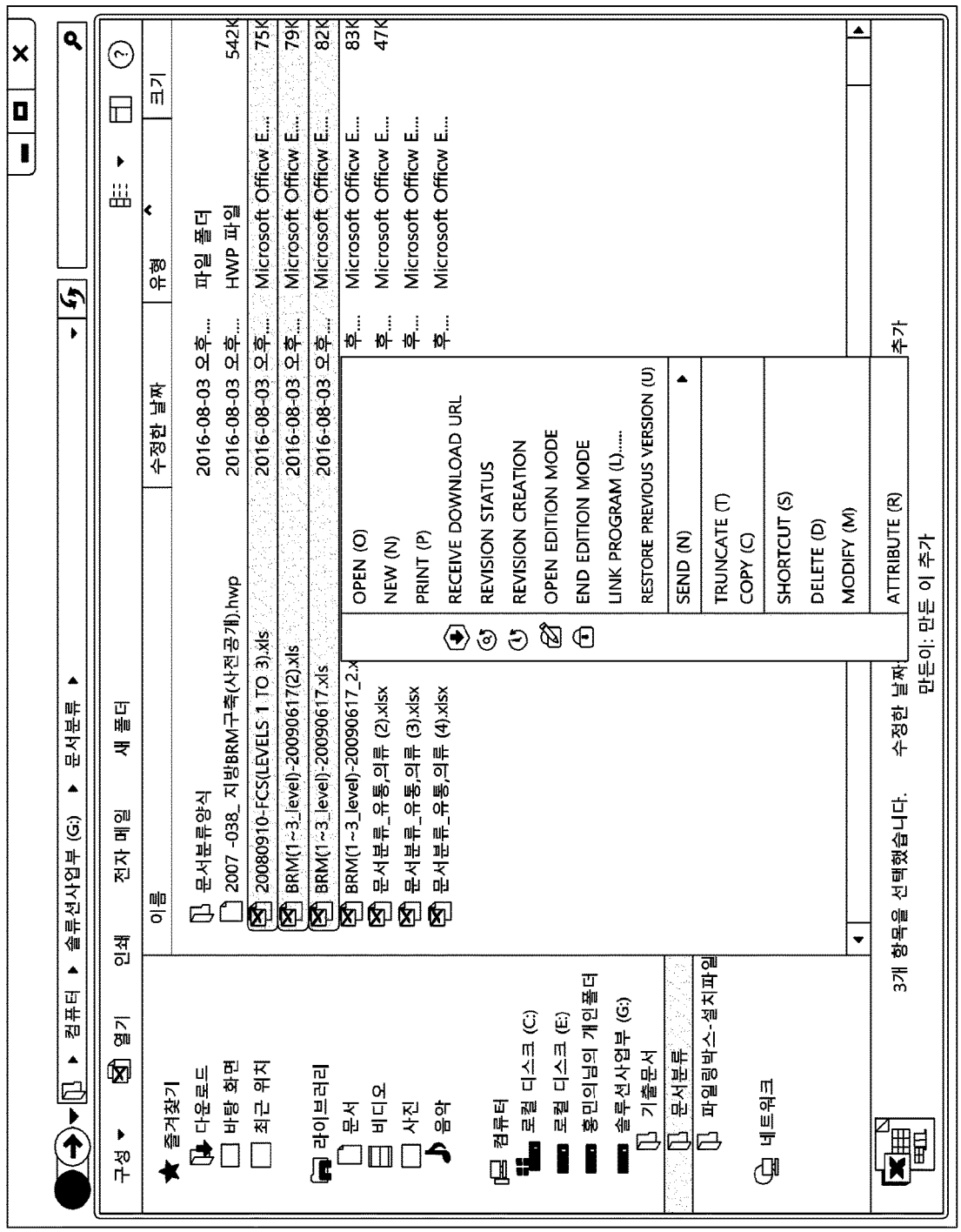
FIG. 6 illustrates an example of executing a network file server client program that allows an edition mode end command to be transmitted when a file locked by the specific user ID is unlocked in the network file server.

Further, it is apparent that a revision may be configured to be forcibly left in the network file server whenever the file in the network file server is switched to the edition mode according to the implementation method. Separately, as illustrated in FIG. 6, the user may leave a revision file by personally selecting 'revision generation'.

Figure 5:
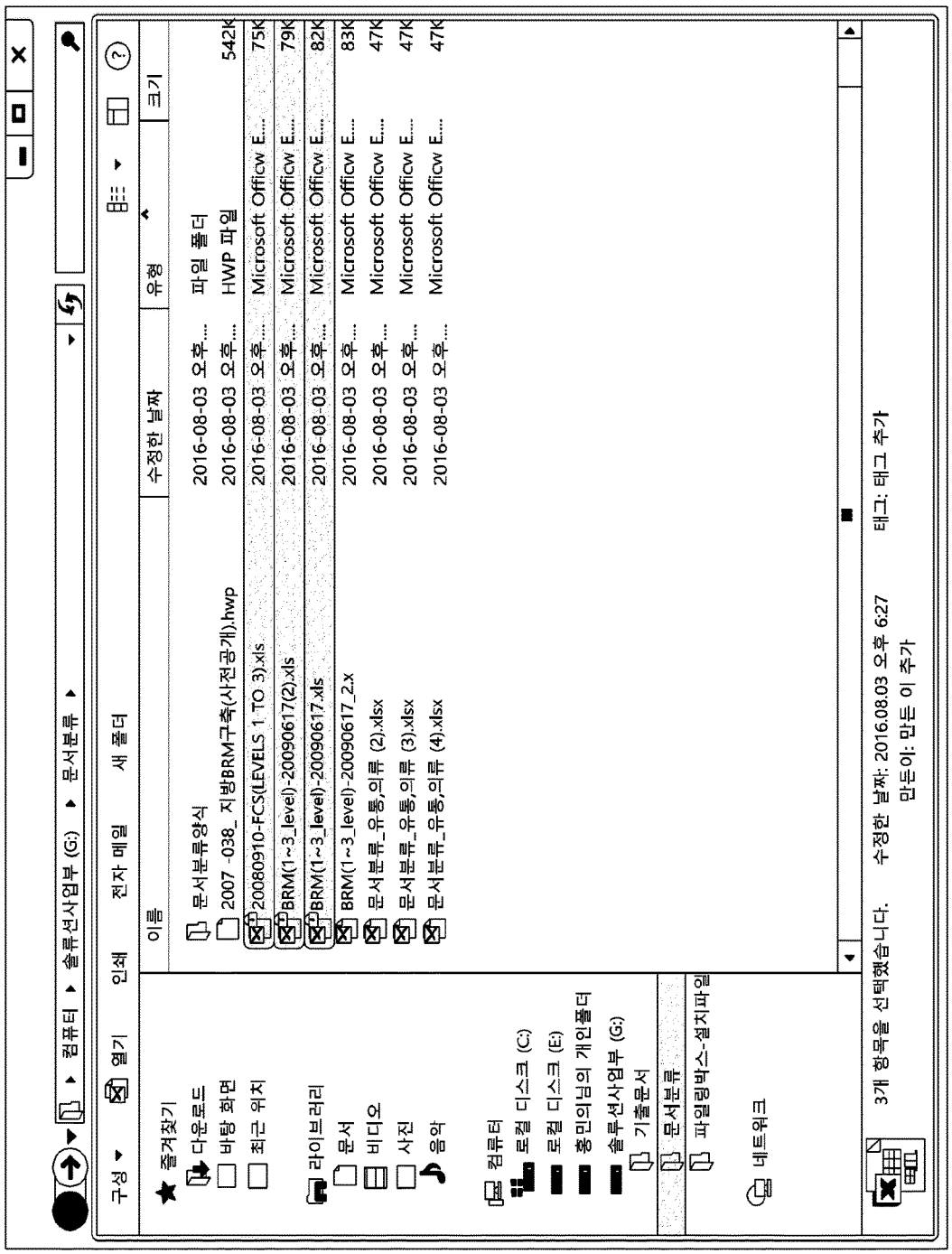
FIG. 5 illustrates an example of a screen that displays a lock-shaped icon is together displayed on a file icon when a file opened in an edition mode is displayed in the Windows browser by a specific user ID.

As described above, when the file is opened in the edition mode, an icon which may make a fact that the corresponding file is executed in the edition mode be visually distinguished may be together displayed as illustrated in FIG. 5. Herein, FIG. 5 illustrates an example of a screen that displays a lock-shaped icon is together displayed on a file icon when a file opened in an edition mode is displayed in the window searcher by a specific user ID.

Further, the edition mode may be subjected to edition mode end processing through user's manipulation. An example thereof is illustrated in FIG. 6 and herein, FIG. 6 illustrates an example of executing a network file server client program that allows an edition mode end command to be transmitted when a file locked by the specific user ID is unlocked in the network file server. In this case, when the edition mode end is selected, the edition mode processing unit of the network file server may delete the corresponding user ID for the file of the corresponding path in the write authority DB so as to prevent the corresponding user from opening the corresponding file in the write mode.

Further, the processing such as the switching to the edition mode or/and the ending of the edition mode may be performed per unit file, but in some cases, the processing such as the switching to the edition mode or/and the ending of the edition mode may be simultaneously performed in a plurality of files within a required range or a set range in driving the file. As one example, when reference files having sub folders need to be simultaneously accessed and used as in the case of CAD or a software development tool, even by switching to/end manipulation of the edition mode for any one file, all corresponding sub folders or reference files in the sub folder associated therewith will be enabled to be switched to the edition mode/ended.

In addition, even when the network file server client attempts to open the file in the path by running the program installed in the PC connected to an extension of the corresponding file, the implementation method may slightly vary depending on the operating system. For example, in the case where the program is run on MS Windows, when the corresponding document is attempted to be read through "Open file path and file name" by using ShellExecute supported by the Shell command, the operating system transfers the corresponding file path to a default connection program while executing a default connection program by viewing the extension of the corresponding file to allow the user to read the document.

In the above description, the case where the custom file system driver transmits a unique value (a hash) and the user ID of the program requesting the file to the network file server Demon whenever a request is made for reading, creating, or changing the file has been primarily described, but in some cases, other modifications may be made. That is, according to the implementation method, if the network file server records the user ID for the connection session after an initial user authentication is performed, the custom file system driver may transfer the user ID to the network file server Demon without attaching the user ID while making the subsequent requests including reading, creation, change, or the like of the file.

Further, it is apparent that the present invention may be similarly applied even to a case where a user PC OS and a service server based on Linux or Unix system mount a specific storage space of the network file server to use data.

In more detail, it is apparent that in a Linux or Unix service server, when the storage space of the network file server is configured as a storage partition of a corresponding system to access data, even though the service server transmits a file reading or modification request to the file stored in the network file server, the file server may block the file access if the file access request is not generated by a previously designated process and the file server may be run to provide the file for only reading if the file server is the previously designated process.

The method for blocking the ransomware attack according to the exemplary embodiment of the present invention may be implemented as a computer readable code in a computer readable recording medium. The computer readable recording medium includes all kinds of recording media storing data which may be deciphered by a computer system. For example, the recording media may include a read only memory (ROM), a random access memory (RAM), a magnetic tape, a magnetic disk, a flash memory, an optical data storage device, etc. Further, the computer readable recording media may be stored and executed as codes which may be distributed in the computer system connected through a computer communication network and read by a distribution method.

The present invention has been described with reference to the exemplary embodiments. However, it will be able to be easily appreciated by those skilled in the art that various modifications and changes of the present disclosure can be made without departing from the spirit and the scope of the present disclosure which are defined in the appended claims and their equivalents.

What is claimed is:

1. A system for blocking an external attack, the system comprising:
   a network file server; and
   a network file server (NFS) client installed in a user terminal or a service server and communicatively connected with the network file server which is remotely positioned,
   in response to detection of an opening request of a file stored in the network file server from the NFS client, the network file server verifies program information contained in the opening request, and determines whether the opening request is authorized based on a result of verification by the network file server, and in response to detection of the opening request being unauthorized, the network file server provides the file of which the opening is requested to the NFS client in a read-only mode, in response to detection of the opening request being dependent of a file browsing program provided by an operating system installed in the user terminal or the service server, the network file server provides the file of which the opening is requested to the NFS client in a read/write mode, wherein the NFS client provides selection information to enable a user to switch to an edition mode or a mode to end a folder of file or disable opening of a file stored in the network file server locally mounted on the user terminal or the service server in a network drive format, and wherein the network file server provides the file of which opening is requested to the NFS client only in a read only mode or disapproves the file change request, when there is a file opening or change request from the NFS client, and the opening or change request is not a request depending on a state in which switching to the edition mode is selected.

2. The system for blocking an external attack of claim 1, wherein the network file server verifies whether a write authority is granted to a user through a write authority database (DB) based on user information to request opening and provides the file of which opening is requested to the NFS client only in the read only mode when the write authority is not granted to the corresponding user.

3. The system for blocking an external attack of claim 1, wherein the network file server verifies whether the corresponding program corresponds to a previously designated program based on the received program information;

in response to detection of the corresponding program not corresponding to the previously designated program, the network file server blocks the access of the file which is requested to be accessed, and only provides the file of which opening is requested to the NFS client as the read only mode.

4. The system for blocking an external attack of claim 1, wherein in response to detection of a creation request of a new file in a network drive mounted on the user terminal or the service server, and in response to edition of the new file being completed and a program being ended, the network file server creates the new file according to the request, registers a user in the write authority database (DB) so as for the user to edit the new created file based on user information to requests creation of the new file, and deletes the write authority of the user from the write authority database (DB).

* * * * *